N. COLUMBRO.
COMBINED COOKING AND HEATING STOVE.
APPLICATION FILED DEC. 26, 1916.
1,221,146.
Patented Apr. 3, 1917.
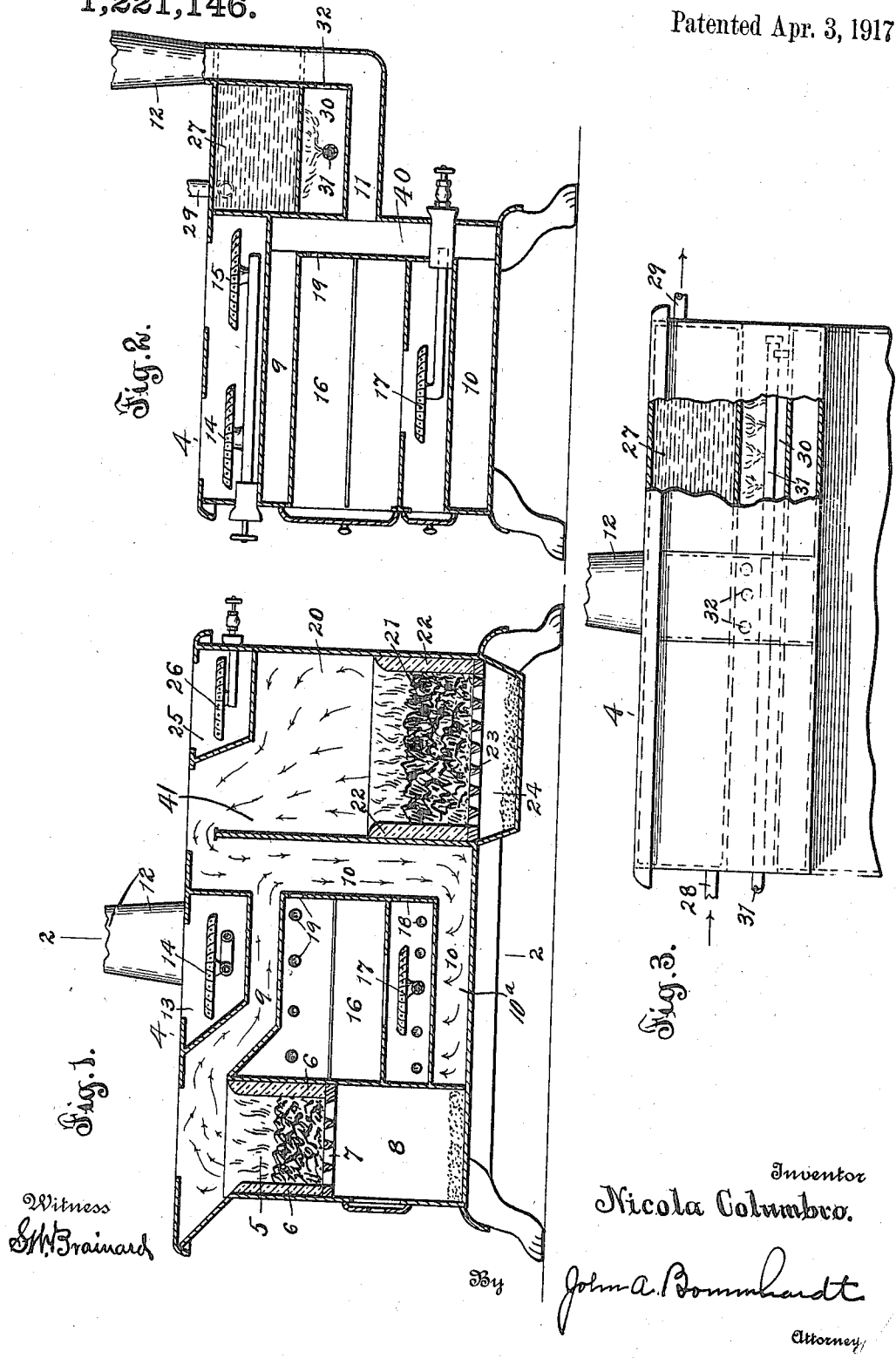
Witness
S.W. Brainard
Inventor
Nicola Columbro.
By John A. Bommhardt
Attorney

UNITED STATES PATENT OFFICE.

NICOLA COLUMBRO, OF CLEVELAND, OHIO.

COMBINED COOKING AND HEATING STOVE.

1,221,146.  Specification of Letters Patent.  Patented Apr. 3, 1917.

Application filed December 26, 1916.  Serial No. 138,816.

*To all whom it may concern:*

Be it known that I, NICOLA COLUMBRO, a citizen of the United States, residing at Cleveland, in the county of Cuyahoga and State of Ohio, have invented certain new and useful Improvements in Combined Cooking and Heating Stoves, of which the following is a specification.

This invention relates to combined cooking and heating stoves, and has for its principal object to produce a combined cooking and heating stove adapted for the use of both gaseous and solid fuel, and characterized by an improved arrangement of flues and compartments as will more fully appear from the following description. The construction is such that either coal or gas can be used, as in winter and summer respectively, to heat the same compartments or parts of the stove.

In the accompanying drawings:

Figure 1 is a vertical longitudinal section of the stove.

Fig. 2 is a cross section on the line 2—2 of Fig. 1.

Fig. 3 is a rear elevation, partly broken away.

Referring specifically to the drawings, 5 indicates a fire pot at one end of the stove, for solid fuel, containing fire brick 6 and a grate 7 under which is an ash pit 8. Heat from this fire pot passes through a flue 9 and a down flue 10 and bottom space 10$^a$, communicating at the rear with a passage 40 leading to a smoke pipe connection 11, thereby passing around an oven 16 located at about the middle of the stove. This fire pot and the connections described, serve for cooking with solid fuel.

In a compartment under the oven is a gas burner 17, supplied with air from the flues 10 and 40 through openings 18, and with outlets 19 from the top of the oven to the smoke pipe connection, for the escape of fumes.

It will be noted that the stove top 4 above the fire pot 5 is heated by the gases from said fire pot before they pass through the flue 9. For heating the stove top I also provide gas burners 14 and 15 located in a compartment 13, above the flue 9, and also burners 26 located in a compartment 25 under the end of the stove top opposite to the fire pot 5. The burners 26 are conveniently used for warming food.

At the end of the stove opposite to the fire pot 5 there is provided a heating compartment 20, divided from the flue 10 by a vertical wall 41, and this compartment contains at its bottom a fire pot 22 for solid fuel 21, a grate 23, and an ash pit 24, and the compartment communicates at its top, over the wall 41, with the down flue 10 leading to the oven and the smoke pipe as above described. This compartment is used for heating purposes, as in cold weather, and also serves to heat the stove top at the corresponding end of the stove, as well as to supply sufficient heat to the compartment 25 for warming purposes.

It will be noticed that the products of combustion from both of the solid fuel fire pots are carried around the oven, and to the same smoke pipe 12. Also that the oven may be heated by gas. Hence for cooking purposes either the small fire pot 5, or the gas burners, or both, may be used. For both heating and cooking the large fire pot is used, or any other desired combination.

Also, in order to heat water, I provide a water back 27 with circulating pipes 28 and 29, at the back of the stove. This is heated by products of combustion in the stove flues and in the smoke pipe connection 11, or by a gas burner 31 in a compartment 30 under the water back, air for the gas burner being admitted through a hole 32 from the flue 11. The water will thus be heated when either fire pot is used, or when the oven burners 17 are used. The construction thus provides a very compact and economical arrangement for the purposes stated.

What I claim as new is:—

A stove having small and large fire pots at opposite ends, the large fire pot being located at the lower part of the stove with a heating compartment above the same, an oven between the fire pots, said oven being located closely adjacent to the small fire pot and being spaced from the large fire pot to form a down-flue leading from the upper end of said heating compartment, a bottom flue under the oven, communicating with the lower end of said down flue, a back flue behind the oven, communicating with said bottom flue, a top flue over the oven, connecting the small fire pot and the upper end of the down flue, a gas burner under the stove top above said top flue, and a gas burner under the stove top, above said heating compartment.

In testimony whereof, I do affix my signature in presence of two witnesses.

NICOLA COLUMBRO.

Witnesses:
JOHN A. BOMMHARDT,
S. W. BRAINARD.